United States Patent
Lesso

(10) Patent No.: US 11,244,690 B2
(45) Date of Patent: *Feb. 8, 2022

(54) DETECTION OF REPLAY ATTACK

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

(*) Notice: Subject to any disclaimer, the term of this patent is extended or adjusted under 35 U.S.C. 154(b) by 54 days.

This patent is subject to a terminal disclaimer.

(21) Appl. No.: 16/184,644

(22) Filed: Nov. 8, 2018

(65) Prior Publication Data
US 2019/0147888 A1 May 16, 2019

Related U.S. Application Data

(60) Provisional application No. 62/585,721, filed on Nov. 14, 2017.

(30) Foreign Application Priority Data

Mar. 26, 2018 (GB) ...................... 1804843

(51) Int. Cl.
*G10L 17/00* (2013.01)
*G10L 17/08* (2013.01)
(Continued)

(52) U.S. Cl.
CPC ............. *G10L 17/08* (2013.01); *G06F 21/305* (2013.01); *G06F 21/32* (2013.01); *G10L 17/02* (2013.01); *G10L 17/06* (2013.01); *G10L 17/26* (2013.01)

(58) Field of Classification Search
CPC ..... G01S 3/80; G01S 5/02; G01S 5/18; G06F 21/32; G06F 2221/2111; G06F 21/566;
(Continued)

(56) References Cited

U.S. PATENT DOCUMENTS 5,197,113 A 3/1993 Mumolo
5,568,559 A 10/1996 Makino
(Continued)

FOREIGN PATENT DOCUMENTS

AU 2015202397 B2 5/2015
CN 1937955 A 3/2007
(Continued)

OTHER PUBLICATIONS

International Search Report and Written Opinion of the International Searching Authority, International Application No. PCT/GB2019/052302, dated Oct. 2, 2019.
(Continued)

*Primary Examiner* — Dionne Pendleton
(74) *Attorney, Agent, or Firm* — Jackson Walker L.L.P.

(57) ABSTRACT

In order to detect a replay attack on a voice biometrics system, a first signal from received sound is generated at a first microphone, and a second signal from the received sound is generated at a second microphone. The first and second signals are used to determine a location of an apparent source of the received sound. It is determined that the received sound may result from a replay attack if the apparent source of the received sound is diffuse.

7 Claims, 8 Drawing Sheets

(51) Int. Cl.
*G06F 21/30* (2013.01)
*G06F 21/32* (2013.01)
*G10L 17/02* (2013.01)
*G10L 17/06* (2013.01)
*G10L 17/26* (2013.01)

(58) Field of Classification Search
CPC ........ G06F 21/305; G06F 21/32; G06F 21/44;
G06F 21/83; G06F 3/167; G10L 15/00;
G10L 15/20; G10L 15/24; G10L 17/06;
G10L 17/22; G10L 21/0208; G10L
21/0316; G10L 17/02; G10L 17/08; G10L
17/26; G10L 19/008; G10L 25/51; G10L
25/18; G10L 17/10; G10L 17/24; G10L
25/03; H05K 999/99; H04R 3/005; H04R
1/406; H04R 2201/405; H04R 2430/21;
H04R 2499/15; H04R 5/027; H04R 5/04;
H04R 19/04; H04R 2201/003; H04R
2420/07; H04R 29/004; H04M 2203/509;
H04M 3/568; H04N 7/15
See application file for complete search history.

(56) References Cited

U.S. PATENT DOCUMENTS

| | | |
|---|---|---|
| 5,710,866 A | 1/1998 | Alleva et al. |
| 5,787,187 A | 7/1998 | Bouchard et al. |
| 5,838,515 A | 11/1998 | Mortazavi et al. |
| 6,182,037 B1 * | 1/2001 | Maes .................. G10L 17/06 704/247 |
| 6,229,880 B1 | 5/2001 | Reformato et al. |
| 6,343,269 B1 | 1/2002 | Harada et al. |
| 6,480,825 B1 | 11/2002 | Sharma et al. |
| 7,016,833 B2 | 3/2006 | Gable et al. |
| 7,039,951 B1 | 5/2006 | Chaudhari et al. |
| 7,418,392 B1 | 8/2008 | Mozer et al. |
| 7,492,913 B2 | 2/2009 | Connor et al. |
| 8,442,824 B2 | 5/2013 | Aley-Raz et al. |
| 8,489,399 B2 | 7/2013 | Gross |
| 8,577,046 B2 | 11/2013 | Aoyagi |
| 8,856,541 B1 | 10/2014 | Chaudhury et al. |
| 8,997,191 B1 | 3/2015 | Stark et al. |
| 9,049,983 B1 | 6/2015 | Baldwin |
| 9,171,548 B2 | 10/2015 | Velius et al. |
| 9,305,155 B1 | 4/2016 | Vo et al. |
| 9,317,736 B1 | 4/2016 | Siddiqui |
| 9,390,726 B1 | 7/2016 | Smus et al. |
| 9,430,629 B1 | 8/2016 | Ziraknejad et al. |
| 9,484,036 B2 * | 11/2016 | Kons .................. G10L 17/22 |
| 9,548,979 B1 | 1/2017 | Johnson et al. |
| 9,600,064 B2 | 3/2017 | Lee et al. |
| 9,641,585 B2 | 5/2017 | Kvaal et al. |
| 9,646,261 B2 | 5/2017 | Agrafioti et al. |
| 9,659,562 B2 | 5/2017 | Lovitt |
| 9,665,784 B2 | 5/2017 | Derakhshani et al. |
| 9,984,314 B2 | 5/2018 | Philipose et al. |
| 9,990,926 B1 | 6/2018 | Pearce |
| 10,032,451 B1 | 7/2018 | Mamkina et al. |
| 10,063,542 B1 | 8/2018 | Kao |
| 10,079,024 B1 | 9/2018 | Bhimanaik et al. |
| 10,097,914 B2 | 10/2018 | Petrank |
| 10,192,553 B1 | 1/2019 | Chenier et al. |
| 10,204,625 B2 | 2/2019 | Mishra et al. |
| 10,210,685 B2 | 2/2019 | Borgmeyer |
| 10,255,922 B1 | 4/2019 | Sharifi et al. |
| 10,277,581 B2 | 4/2019 | Chandrasekharan et al. |
| 10,305,895 B2 | 5/2019 | Barry et al. |
| 10,318,580 B2 | 6/2019 | Topchy et al. |
| 10,334,350 B2 | 6/2019 | Petrank |
| 10,460,095 B2 | 10/2019 | Boesen |
| 10,467,509 B2 | 11/2019 | Albadawi et al. |
| 10,692,492 B2 | 6/2020 | Rozen et al. |
| 10,733,987 B1 | 8/2020 | Govender et al. |
| 10,977,349 B2 | 4/2021 | Suh et al. |
| 2002/0194003 A1 | 12/2002 | Mozer |
| 2003/0033145 A1 | 2/2003 | Petrushin |
| 2003/0177006 A1 | 9/2003 | Ichikawa et al. |
| 2003/0177007 A1 * | 9/2003 | Kanazawa .............. G10L 15/20 704/233 |
| 2003/0182119 A1 * | 9/2003 | Junqua .................. G10L 15/24 704/246 |
| 2004/0030550 A1 | 2/2004 | Liu |
| 2004/0141418 A1 | 7/2004 | Matsuo et al. |
| 2004/0230432 A1 | 11/2004 | Liu et al. |
| 2005/0060153 A1 | 3/2005 | Gable et al. |
| 2005/0171774 A1 | 8/2005 | Applebaum et al. |
| 2006/0116874 A1 | 6/2006 | Samuelsson et al. |
| 2006/0171571 A1 | 8/2006 | Chan et al. |
| 2007/0055517 A1 | 3/2007 | Spector |
| 2007/0129941 A1 | 6/2007 | Tavares |
| 2007/0185718 A1 | 8/2007 | Di Mambro et al. |
| 2007/0233483 A1 | 10/2007 | Kuppuswamy et al. |
| 2007/0250920 A1 | 10/2007 | Lindsay |
| 2008/0071532 A1 | 3/2008 | Ramakrishnan et al. |
| 2008/0082510 A1 | 4/2008 | Wang et al. |
| 2008/0223646 A1 | 9/2008 | White |
| 2008/0262382 A1 | 10/2008 | Akkermans et al. |
| 2008/0285813 A1 | 11/2008 | Holm |
| 2009/0087003 A1 | 4/2009 | Zurek et al. |
| 2009/0105548 A1 | 4/2009 | Bart |
| 2009/0167307 A1 | 7/2009 | Kopp |
| 2009/0232361 A1 | 9/2009 | Miller |
| 2009/0281809 A1 | 11/2009 | Reuss |
| 2009/0319270 A1 | 12/2009 | Gross |
| 2010/0004934 A1 | 1/2010 | Hirose et al. |
| 2010/0076770 A1 | 3/2010 | Ramaswamy |
| 2010/0204991 A1 | 8/2010 | Ramakrishnan et al. |
| 2010/0328033 A1 | 12/2010 | Kamei |
| 2011/0051907 A1 | 3/2011 | Jaiswal et al. |
| 2011/0142268 A1 | 6/2011 | Iwakuni et al. |
| 2011/0246198 A1 | 10/2011 | Asenjo et al. |
| 2011/0276323 A1 | 11/2011 | Seyfetdinov |
| 2011/0314530 A1 | 12/2011 | Donaldson |
| 2011/0317848 A1 | 12/2011 | Ivanov et al. |
| 2012/0110341 A1 | 5/2012 | Beigi |
| 2012/0223130 A1 | 9/2012 | Knopp et al. |
| 2012/0224456 A1 * | 9/2012 | Visser .................. G01S 15/876 367/127 |
| 2012/0249328 A1 | 10/2012 | Xiong |
| 2012/0323796 A1 | 12/2012 | Udani |
| 2013/0024191 A1 | 1/2013 | Krutsch et al. |
| 2013/0058488 A1 | 3/2013 | Cheng et al. |
| 2013/0080167 A1 | 3/2013 | Mozer |
| 2013/0225128 A1 | 8/2013 | Gomar |
| 2013/0227678 A1 | 8/2013 | Kang |
| 2013/0247082 A1 | 9/2013 | Wang et al. |
| 2013/0279297 A1 | 10/2013 | Wulff et al. |
| 2013/0279724 A1 | 10/2013 | Stafford et al. |
| 2013/0289999 A1 | 10/2013 | Hymel |
| 2014/0059347 A1 | 2/2014 | Dougherty et al. |
| 2014/0149117 A1 | 5/2014 | Bakish et al. |
| 2014/0172430 A1 | 6/2014 | Rutherford et al. |
| 2014/0188770 A1 | 7/2014 | Agrafioti et al. |
| 2014/0237576 A1 | 8/2014 | Zhang et al. |
| 2014/0241597 A1 | 8/2014 | Leite |
| 2014/0293749 A1 | 10/2014 | Gervaise |
| 2014/0307876 A1 | 10/2014 | Agiomyrgiannakis et al. |
| 2014/0330568 A1 | 11/2014 | Lewis et al. |
| 2014/0337945 A1 | 11/2014 | Jia et al. |
| 2014/0343703 A1 | 11/2014 | Topchy et al. |
| 2015/0006163 A1 | 1/2015 | Liu et al. |
| 2015/0033305 A1 | 1/2015 | Shear et al. |
| 2015/0036462 A1 | 2/2015 | Calvarese |
| 2015/0088509 A1 | 3/2015 | Gimenez et al. |
| 2015/0089616 A1 | 3/2015 | Brezinski et al. |
| 2015/0112682 A1 | 4/2015 | Rodriguez et al. |
| 2015/0134330 A1 | 5/2015 | Baldwin et al. |
| 2015/0161370 A1 | 6/2015 | North et al. |
| 2015/0161459 A1 | 6/2015 | Boczek |
| 2015/0168996 A1 | 6/2015 | Sharpe et al. |
| 2015/0245154 A1 | 8/2015 | Dadu et al. |
| 2015/0261944 A1 | 9/2015 | Hosom et al. |

(56) References Cited

U.S. PATENT DOCUMENTS

| | | |
|---|---|---|
| 2015/0276254 A1 | 10/2015 | Nemcek et al. |
| 2015/0301796 A1 | 10/2015 | Visser et al. |
| 2015/0332665 A1 | 11/2015 | Mishra et al. |
| 2015/0347734 A1 | 12/2015 | Beigi |
| 2015/0356974 A1 | 12/2015 | Tani et al. |
| 2015/0371639 A1 | 12/2015 | Foerster et al. |
| 2016/0007118 A1 | 1/2016 | Lee et al. |
| 2016/0026781 A1 | 1/2016 | Boczek |
| 2016/0066113 A1 | 3/2016 | Elkhatib et al. |
| 2016/0071275 A1 | 3/2016 | Hirvonen |
| 2016/0071516 A1 | 3/2016 | Lee et al. |
| 2016/0086607 A1 | 3/2016 | Aley-Raz et al. |
| 2016/0086609 A1 | 3/2016 | Yue et al. |
| 2016/0111112 A1 | 4/2016 | Hayakawa |
| 2016/0125877 A1 | 5/2016 | Foerster et al. |
| 2016/0125879 A1 | 5/2016 | Lovitt |
| 2016/0147987 A1 | 5/2016 | Jang et al. |
| 2016/0182998 A1 | 6/2016 | Galal et al. |
| 2016/0210407 A1 | 7/2016 | Hwang et al. |
| 2016/0217321 A1 | 7/2016 | Gottleib |
| 2016/0217795 A1 | 7/2016 | Lee et al. |
| 2016/0234204 A1 | 8/2016 | Rishi et al. |
| 2016/0314790 A1 | 10/2016 | Tsujikawa et al. |
| 2016/0324478 A1 | 11/2016 | Goldstein |
| 2016/0330198 A1 | 11/2016 | Stern et al. |
| 2016/0371555 A1 | 12/2016 | Derakhshani |
| 2016/0372139 A1 | 12/2016 | Cho et al. |
| 2017/0011406 A1 | 1/2017 | Tunnell et al. |
| 2017/0049335 A1 | 2/2017 | Duddy |
| 2017/0068805 A1 | 3/2017 | Chandrasekharan et al. |
| 2017/0078780 A1 | 3/2017 | Qian et al. |
| 2017/0110117 A1 | 4/2017 | Chakladar et al. |
| 2017/0110121 A1 | 4/2017 | Warford et al. |
| 2017/0112671 A1 | 4/2017 | Goldstein |
| 2017/0116995 A1 | 4/2017 | Ady et al. |
| 2017/0134377 A1 | 5/2017 | Tokunaga et al. |
| 2017/0150254 A1 | 5/2017 | Bakish et al. |
| 2017/0161482 A1 | 6/2017 | Eltoft et al. |
| 2017/0162198 A1 | 6/2017 | Chakladar et al. |
| 2017/0169828 A1 | 6/2017 | Sachdev |
| 2017/0200451 A1 | 7/2017 | Bocklet et al. |
| 2017/0213268 A1 | 7/2017 | Puehse et al. |
| 2017/0214687 A1 | 7/2017 | Klein et al. |
| 2017/0231534 A1 | 8/2017 | Agassy et al. |
| 2017/0243597 A1* | 8/2017 | Braasch ............... G10L 21/0264 |
| 2017/0256270 A1 | 9/2017 | Singaraju et al. |
| 2017/0279815 A1 | 9/2017 | Chung et al. |
| 2017/0287490 A1 | 10/2017 | Biswal et al. |
| 2017/0293749 A1 | 10/2017 | Baek et al. |
| 2017/0323644 A1 | 11/2017 | Kawato |
| 2017/0347180 A1 | 11/2017 | Petrank |
| 2017/0347348 A1 | 11/2017 | Masaki et al. |
| 2017/0351487 A1 | 12/2017 | Aviles-Casco Vaquero et al. |
| 2017/0373655 A1 | 12/2017 | Mengad et al. |
| 2018/0018974 A1 | 1/2018 | Zass |
| 2018/0032712 A1 | 2/2018 | Oh et al. |
| 2018/0039769 A1 | 2/2018 | Saunders et al. |
| 2018/0047393 A1* | 2/2018 | Tian ........................ G01S 3/80 |
| 2018/0060552 A1 | 3/2018 | Pellom et al. |
| 2018/0060557 A1 | 3/2018 | Valenti et al. |
| 2018/0096120 A1 | 4/2018 | Boesen |
| 2018/0107866 A1 | 4/2018 | Li et al. |
| 2018/0108225 A1 | 4/2018 | Mappus et al. |
| 2018/0113673 A1 | 4/2018 | Sheynblat |
| 2018/0121161 A1 | 5/2018 | Ueno et al. |
| 2018/0146370 A1 | 5/2018 | Krishnaswamy et al. |
| 2018/0166071 A1 | 6/2018 | Lee et al. |
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1 | 7/2018 | Lindemann |
| 2018/0232201 A1 | 8/2018 | Holtmann |
| 2018/0232511 A1 | 8/2018 | Bakish |
| 2018/0233142 A1 | 8/2018 | Koishida et al. |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0336716 A1 | 11/2018 | Ramprashad et al. |
| 2018/0336901 A1 | 11/2018 | Masaki et al. |
| 2018/0342237 A1 | 11/2018 | Lee et al. |
| 2018/0349585 A1 | 12/2018 | Ahn et al. |
| 2018/0358020 A1 | 12/2018 | Chen et al. |
| 2018/0366124 A1 | 12/2018 | Cilingir et al. |
| 2018/0374487 A1 | 12/2018 | Lesso |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0027152 A1 | 1/2019 | Huang et al. |
| 2019/0030452 A1 | 1/2019 | Fassbender et al. |
| 2019/0042871 A1 | 2/2019 | Pogorelik |
| 2019/0065478 A1 | 2/2019 | Tsujikawa et al. |
| 2019/0098003 A1 | 3/2019 | Ota |
| 2019/0103115 A1* | 4/2019 | Lesso ...................... G06F 21/32 |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0122670 A1 | 4/2019 | Roberts et al. |
| 2019/0147888 A1 | 5/2019 | Lesso |
| 2019/0149932 A1 | 5/2019 | Lesso |
| 2019/0180014 A1 | 6/2019 | Kovvali et al. |
| 2019/0197755 A1 | 6/2019 | Vats |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0294629 A1 | 9/2019 | Wexler et al. |
| 2019/0295554 A1 | 9/2019 | Lesso |
| 2019/0304470 A1 | 10/2019 | Ghaeemaghami et al. |
| 2019/0306594 A1 | 10/2019 | Aumer et al. |
| 2019/0311722 A1 | 10/2019 | Caldwell |
| 2019/0313014 A1 | 10/2019 | Welbourne et al. |
| 2019/0318035 A1 | 10/2019 | Blanco et al. |
| 2019/0356588 A1 | 11/2019 | Shahraray et al. |
| 2019/0371330 A1 | 12/2019 | Lin et al. |
| 2019/0372969 A1 | 12/2019 | Chang et al. |
| 2019/0373438 A1 | 12/2019 | Amir et al. |
| 2019/0392145 A1 | 12/2019 | Komogortsev |
| 2019/0394195 A1 | 12/2019 | Chari et al. |
| 2020/0035247 A1 | 1/2020 | Boyadjiev et al. |
| 2020/0204937 A1 | 6/2020 | Lesso |
| 2020/0227071 A1 | 7/2020 | Lesso |
| 2020/0265834 A1 | 8/2020 | Lesso et al. |
| 2020/0286492 A1* | 9/2020 | Lesso ................... H04R 29/004 |

FOREIGN PATENT DOCUMENTS

| | | |
|---|---|---|
| CN | 104252860 A | 12/2014 |
| CN | 104956715 A | 9/2015 |
| CN | 105185380 A | 12/2015 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| CN | 107251573 A | 10/2017 |
| EP | 1205884 A2 | 5/2002 |
| EP | 1701587 A2 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| GB | 2375205 A | 11/2002 |
| GB | 2499781 A | 9/2013 |

(56) References Cited

FOREIGN PATENT DOCUMENTS

| | | |
|---|---|---|
| GB | 2515527 A | 12/2014 |
| GB | 2551209 A | 12/2017 |
| JP | 2003058190 A | 2/2003 |
| JP | 2006010809 A | 1/2006 |
| JP | 2010086328 A | 4/2010 |
| WO | 98/34216 A2 | 8/1998 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A1 | 4/2017 |
| WO | 2017203484 A1 | 11/2017 |

OTHER PUBLICATIONS

Liu, Yuan et al., "Speaker verification with deep features", Jul. 2014, in International Joint Conference on Neural Networks (IJCNN), pp. 747-753, IEEE.
International Search Report and Written Opinion of the International Searching Authority, International Application No. PCT/GB2018/051927, dated Sep. 25, 2018.
Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2018/051931, dated Sep. 27, 2018.
Combined Search and Examination Report under Sections 17 and 18(3), UKIPO, Application No. 1801527.1, dated Jul. 25, 2018.
International Search Report and Written Opinion of the International Searching Authority, International Application No. PCT/GB2018/051925, dated Sep. 26, 2018.
Combined Search and Examination Report under Sections 17 and 18(3), UKIPO, Application No. 1801528.9, dated Jul. 25, 2018.
International Search Report and Written Opinion of the International Searching Authority, International Application No. PCT/GB2018/051928, dated Dec. 3, 2018.
Combined Search and Examination Report under Sections 17 and 18(3), UKIPO, Application No. 1801532.1, dated Jul. 25, 2018.
International Search Report and Written Opinion of the International Searching Authority, International Application No. PCT/GB2019/050185, dated Apr. 2, 2019.
International Search Report and Written Opinion of the International Searching Authority, International Application No. PCT/GB2018/053274, dated Jan. 24, 2019.
Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", Interspeech 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, dated Jan. 25, 2019.
Combined Search and Examination Report, UKIPO, Application No. GB1713699.5, dated Feb. 21, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1809474.8, dated Jul. 23, 2018.
Nu et al., Anti-Spoofing for text-independent Speaker Verification: An Initial Database, Comparison of Countermeasures, and Human Performance, IEEE/ACM Transactions on Audio, Speech, and Language Processing, Issue Date: Apr. 2016.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
International Search Report and Written Opinion of the International Searching Authority, International Application No. PCT/GB2018/052907, dated Jan. 15, 2019.
Ajmera, et al,, "Robust Speaker Change Detection," IEEE Signal Processing Letters, vol. 11, No. 8, pp. 649-651, Aug. 2004.
Combined Search and Examination Report under Sections 17 and 18(3), UKIPO, Application No. GB1803570.9, dated Aug. 21, 2018.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801684.2, dated Aug. 1, 2018.
Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1801659.2, dated Jul. 26, 2018.
International Search Report and Written Opinion of the International Searching Authority, International Application No. PCT/GB2018/052906, dated Jan. 14, 2019.
Further Search Report under Sections 17 (6), UKIPO, Application No. GB1719731.0, dated Nov. 26, 2018.
Combined Search and Examination Report, UKIPO, Application No. GB1713697.9, dated Feb. 20, 2018.
Villalba, Jesus et al., Preventing Replay Attacks on Speaker Verification Systems, International Carnahan Conference on Security Technology (ICCST), 2011 IEEE, Oct. 18, 2011, pp. 1-8.
Combined Search and Examination Report under Sections 17 and 18(3), UKIPO, Application No. GB1804843.9, dated Sep. 27, 2018.
Chen et al., You Can Hear But You Cannot Steal: Defending Against Voice Impersonation Attacks on Smartphones, 2017 IEEE 37th Proceedings of the International Conference on Distributed Computing Systems, pp. 183-195.
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inauidable voice commands allow attackers to control Siri, Alexa and other digital assistants, Sep. 2017.
Lucas, Jim, What is Electromagnetic Radiation?, Mar. 13, 2015, Live Science, https://www.livescience.com/38169-electromagnetism.html, pp. 1-11 (Year: 2015).

(56) References Cited

OTHER PUBLICATIONS

Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.

First Office Action, China National Intellectual Property Administration, Patent Application No. 2018800418983, dated May 29, 2020.

International Search Report and Written Opinion, International Application No. PCT/GB2020/050723, dated Jun. 16, 2020.

Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.

Seha, Sherif Nagib Abbas et al., "Human recognition using transient auditory evoked potentials: a preliminary study", IET Biometrics, IEEE, Michael Faraday House, Six Hills Way, Stevenage, Herts., UK, vol. 7, No. 3, May 1, 2018, pp. 242-250.

Liu, Yuxi et al., "Biometric identification based on Transient Evoked Otoacoustic Emission", IEEE International Symposium on Signal Processing and Information Technology, IEEE, Dec. 12, 2013, pp. 267-271.

Toth, Arthur R., et al., Synthesizing Speech from Doppler Signals, ICASSP 2010, IEEE, pp. 4638-4641.

Boesen, U.S. Appl. No. 62/403,045, filed Sep. 30, 2017.

Meng, Y. et al., "Liveness Detection for Voice User Interface via Wireless Signals in IoT Environment," in IEEE Transactions on Dependable and Secure Computing, doi: 10.1109/TDSC.2020.2973620.

Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.

First Office Action, China National Intellectual Property Administration, Application No. 2018800720846, dated Mar. 1, 2021.

Wu, Libing, et al., LVID: A Multimodal Biometricas Authentication System on Smartphones, IEEE Transactions on Information Forensics and Security, Vo. 15, 2020, pp. 1572-1585.

Wang, Qian, et al., VoicePop: A Pop Noise based Anti-spoofing System for Voice Authentication on Smartphones, IEEE INFOCOM 2019—IEEE Conference on Computer Communications, April 29-May 2, 2019, pp. 2062-2070.

Examination Report under Section 18(3), UKIPO, Application No. GB1918956.2, dated Jul. 29, 2021.

Examination Report under Section 18(3), UKIPO, Application No. GB1918965.3, dated Aug. 2, 2021.

Combined Search and Examination Report under Sections 17 and 18(3), UKIPO, Application No. GB2105613.0, dated Sep. 27, 2021.

* cited by examiner

DETECTION OF REPLAY ATTACK

TECHNICAL FIELD

Embodiments described herein relate to methods and devices for detecting a replay attack on a voice biometrics system.

BACKGROUND

Voice biometrics systems are becoming widely used. In such a system, a user trains the system by providing samples of their speech during an enrolment phase. In subsequent use, the system is able to discriminate between the enrolled user and non-registered speakers. Voice biometrics systems can in principle be used to control access to a wide range of services and systems.

One way for a malicious party to attempt to defeat a voice biometrics system is to obtain a recording of the enrolled user's speech, and to play back the recording in an attempt to impersonate the enrolled user and to gain access to services that are intended to be restricted to the enrolled user.

This is referred to as a replay attack, or as a spoofing attack.

SUMMARY

According to an aspect of the present invention, there is provided a method of detecting a replay attack on a voice biometrics system, the method comprising: generating a first signal from received sound at a first microphone;
generating a second signal from the received sound at a second microphone;
using the first and second signals to determine a location of an apparent source of the received sound; and
determining that the received sound may result from a replay attack if the apparent source of the received sound is diffuse.

According to another aspect of the present invention, there is provided a system for detecting a replay attack on a voice biometrics system, the system being configured for performing the method.

According to an aspect of the present invention, there is provided a detecting a replay attack on a speech recognition system, for example a voice biometrics system, the method comprising:
generating a first signal from received sound at a first microphone;
generating a second signal from the received sound at a second microphone;
determining a correlation function based on a correlation between the first signal and the second signal;
calculating a width of a central lobe of the determined correlation function; and
determining that the received sound may result from a replay attack if the width of the central lobe of the determined correlation function exceeds a threshold value.

According to another aspect of the present invention, there is provided a system for detecting a replay attack on a speech recognition system, for example a voice biometrics system, the system being configured for performing the method.

According to an aspect of the present invention, there is provided a method of detecting a replay attack on a voice biometrics system, the method comprising:
generating a first signal from received sound at a first microphone, wherein the first signal has a first component at a first frequency and a second component at a second frequency, and wherein the first frequency is higher than the second frequency;
generating a second signal from the received sound at a second microphone, wherein the second signal has a first component at the first frequency and a second component at the second frequency;
determining a first correlation function based on a correlation between the first component of the first signal and the first component of the second signal;
calculating a width of a central lobe of the determined first correlation function;
determining a second correlation function based on a correlation between the second component of the first signal and the second component of the second signal;
calculating a width of a central lobe of the determined second correlation function; and
determining that the received sound may result from a replay attack if the width of the central lobe of the determined second correlation function exceeds the width of the central lobe of the determined first correlation function by more than a threshold value.

According to another aspect of the present invention, there is provided a system for detecting a replay attack on a voice biometrics system, the system being configured for performing the method.

According to another aspect of the present invention, there is provided a device comprising a system according to any previous aspect. The device may comprise a mobile telephone, an audio player, a video player, a mobile computing platform, a games device, a remote controller device, a toy, a machine, or a home automation controller or a domestic appliance.

According to another aspect of the present invention, there is provided a computer program product, comprising a computer-readable tangible medium, and instructions for performing a method according to the first, second, or third aspect.

According to another aspect of the present invention, there is provided a non-transitory computer readable storage medium having computer-executable instructions stored thereon that, when executed by processor circuitry, cause the processor circuitry to perform a method according to the first, second, or third aspect.

According to another aspect of the present invention, there is provided a device comprising the non-transitory computer readable storage medium according to the previous aspect. The device may comprise a mobile telephone, an audio player, a video player, a mobile computing platform, a games device, a remote controller device, a toy, a machine, or a home automation controller or a domestic appliance.

BRIEF DESCRIPTION OF DRAWINGS

For a better understanding of the present invention, and to show how it may be put into effect, reference will now be made to the accompanying drawings, in which:—

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems, for example a mobile telephone, an audio player, a video player, a mobile computing platform, a games device, a remote controller device, a toy, a machine, or a home automation controller or a domestic appliance. However, for ease of explanation of one embodiment, an illustrative example will be described, in which the implementation occurs in a smartphone.

Figure 1:
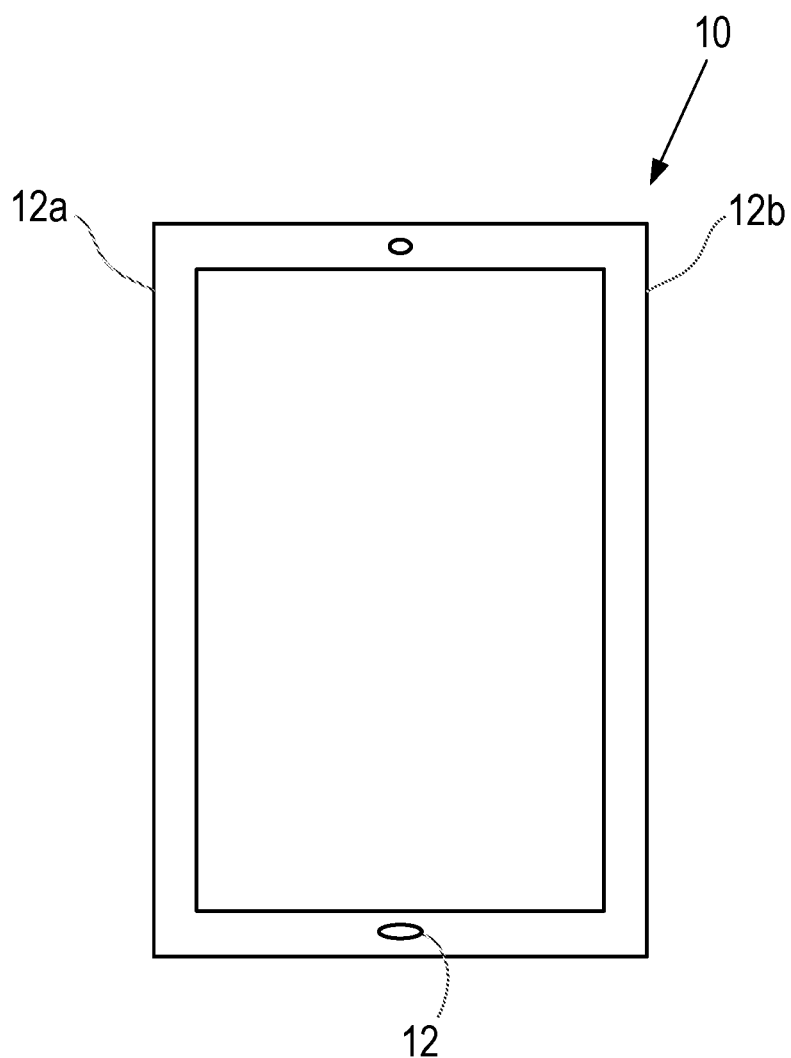
FIG. 1 illustrates a smartphone.

FIG. 1 illustrates a smartphone 10, having microphones 12, 12a, and 12b for detecting ambient sounds. In this example, the microphone 12 is of course used for detecting the speech of a user who is holding the smartphone 10, while the microphones 12a, 12b are provided on the upper part of the sides of the smartphone 10, and are therefore not clearly visible in FIG. 1.

Figure 2:
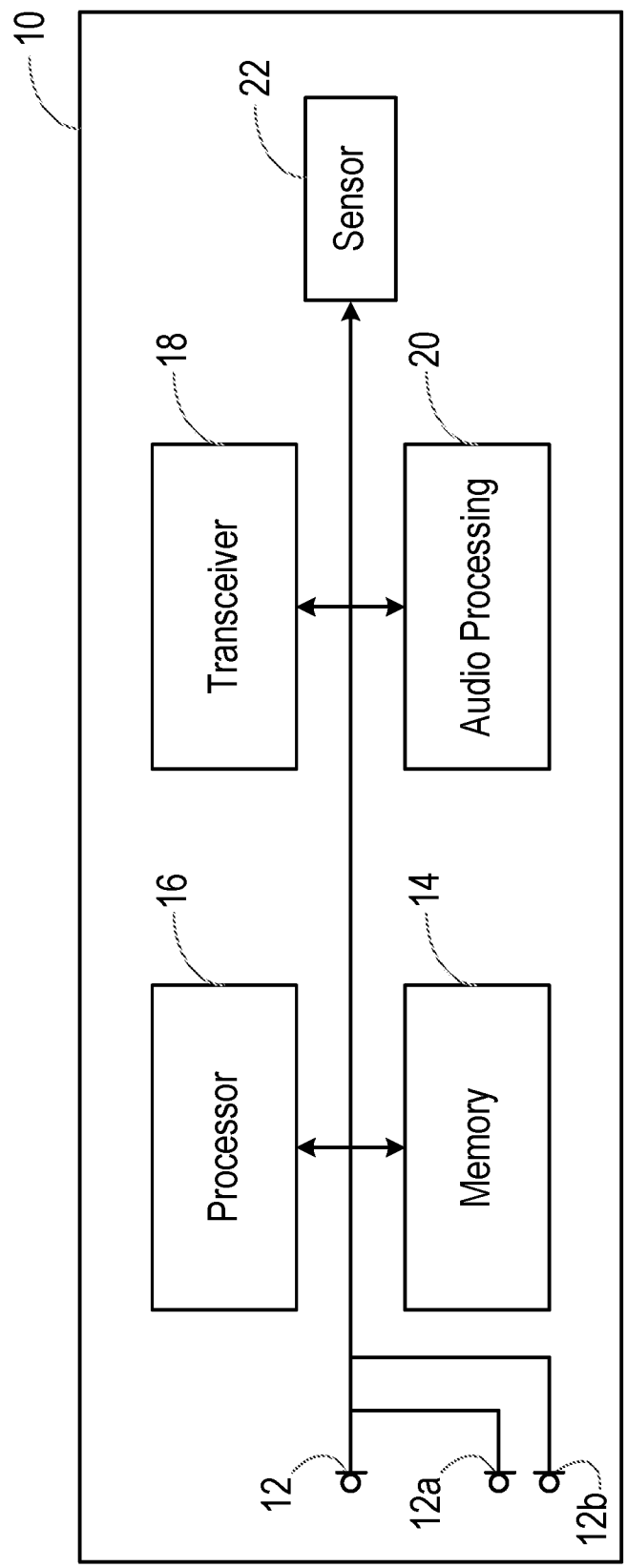
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

FIG. 2 also shows at least one sensor 22. In embodiments of the present invention, the sensor is a magnetic field sensor for detecting a magnetic field. For example, the sensor 22 may be a Hall effect sensor, that is able to provide separate measurements of the magnet field strength in three orthogonal directions. Further examples of sensors which may be used may comprise gyro sensors, accelerometers, or software-based sensors operable to determine phone orientation, wherein such software-based sensors may operate in combination with software programs such as the FaceTime™ system provided by Apple, Inc.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote servers in a cloud computing environment. Signals based on the meaning of the spoken commands are then returned to the smartphone 10 or other local device. In other embodiments, the speech recognition system is also provided on the smartphone 10.

One attempt to deceive a voice biometric system or an automatic speech recognition system is to play a recording of an enrolled user's voice in a so-called replay or spoof attack.

The method is therefore described herein with reference to one example, where it is desirable to detect when sound is being played through a loudspeaker, rather than being generated by a human speaker. However, the method is equally applicable to other situations in which it is useful to detect whether sound is coming from a point source or a more diffuse source. One such example might be when it is desired to detect when the sound received by an automatic speech recognition system has been generated by a loudspeaker.

Figure 3:
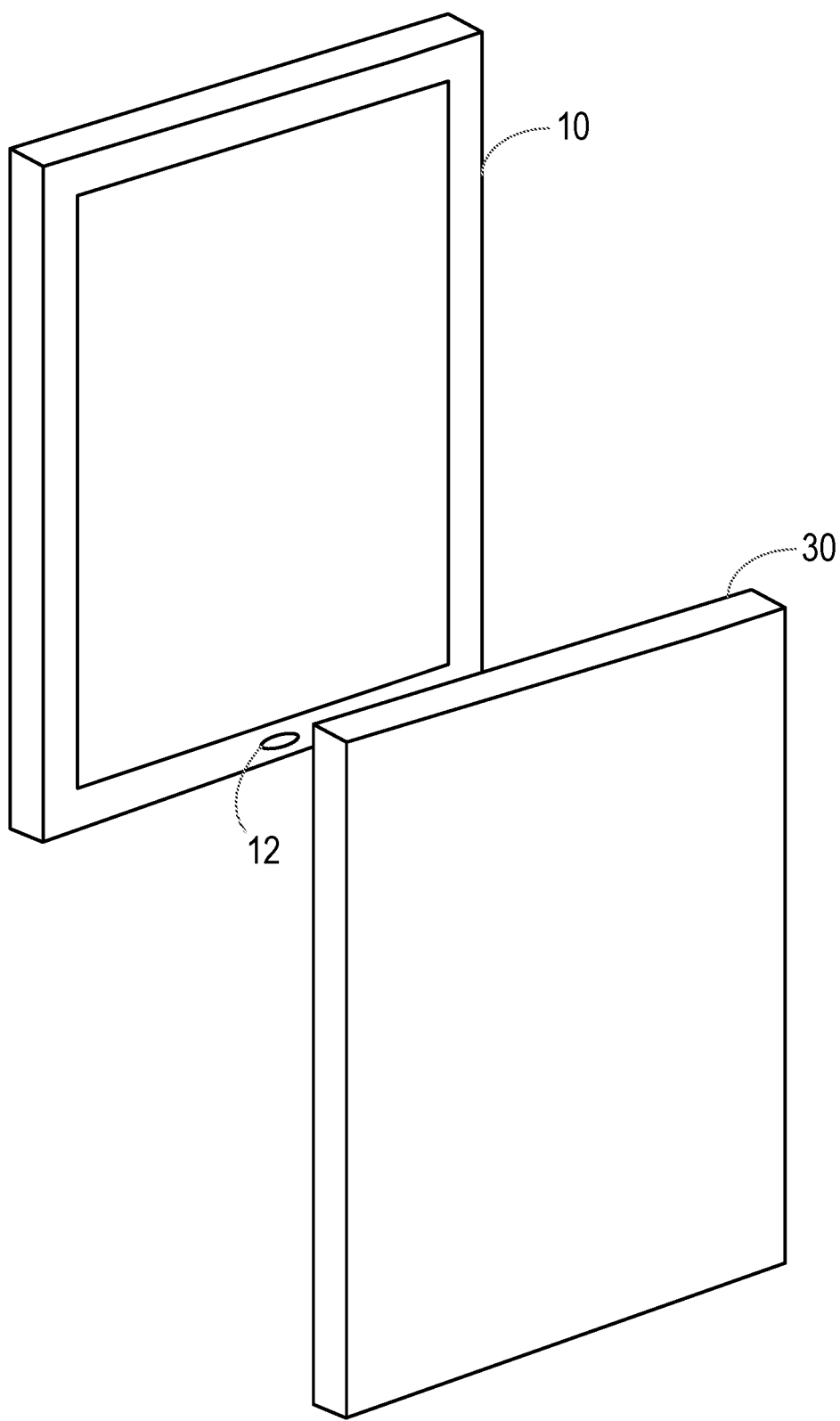
FIG. 3 illustrates a first situation in which a replay attack is being performed.

FIG. 3 shows an example of a situation in which a replay attack is being performed. Thus, in FIG. 3, the smartphone 10 is provided with voice biometric functionality. In this example, the smartphone 10 is in the possession, at least temporarily, of an attacker, who has another smartphone 30. The smartphone 30 has been used to record the voice of the enrolled user of the smartphone 10. The smartphone 30 is brought close to the microphone inlet 12 of the smartphone 10, and the recording of the enrolled user's voice is played back. If the voice biometric system is unable to detect that the enrolled user's voice that it detects is a recording, the attacker will gain access to one or more services that are intended to be accessible only by the enrolled user.

It is known that smartphones, such as the smartphone 30, are typically provided with loudspeakers that are of relatively low quality due to size constraints. Thus, the recording of an enrolled user's voice played back through such a loudspeaker will not be a perfect match with the user's voice, and this fact can be used to identify replay attacks. For example, loudspeakers may have certain frequency characteristics, and if these frequency characteristics can be detected in a speech signal that is received by the voice biometrics system, it may be considered that the speech signal has resulted from a replay attack.

Figure 4:
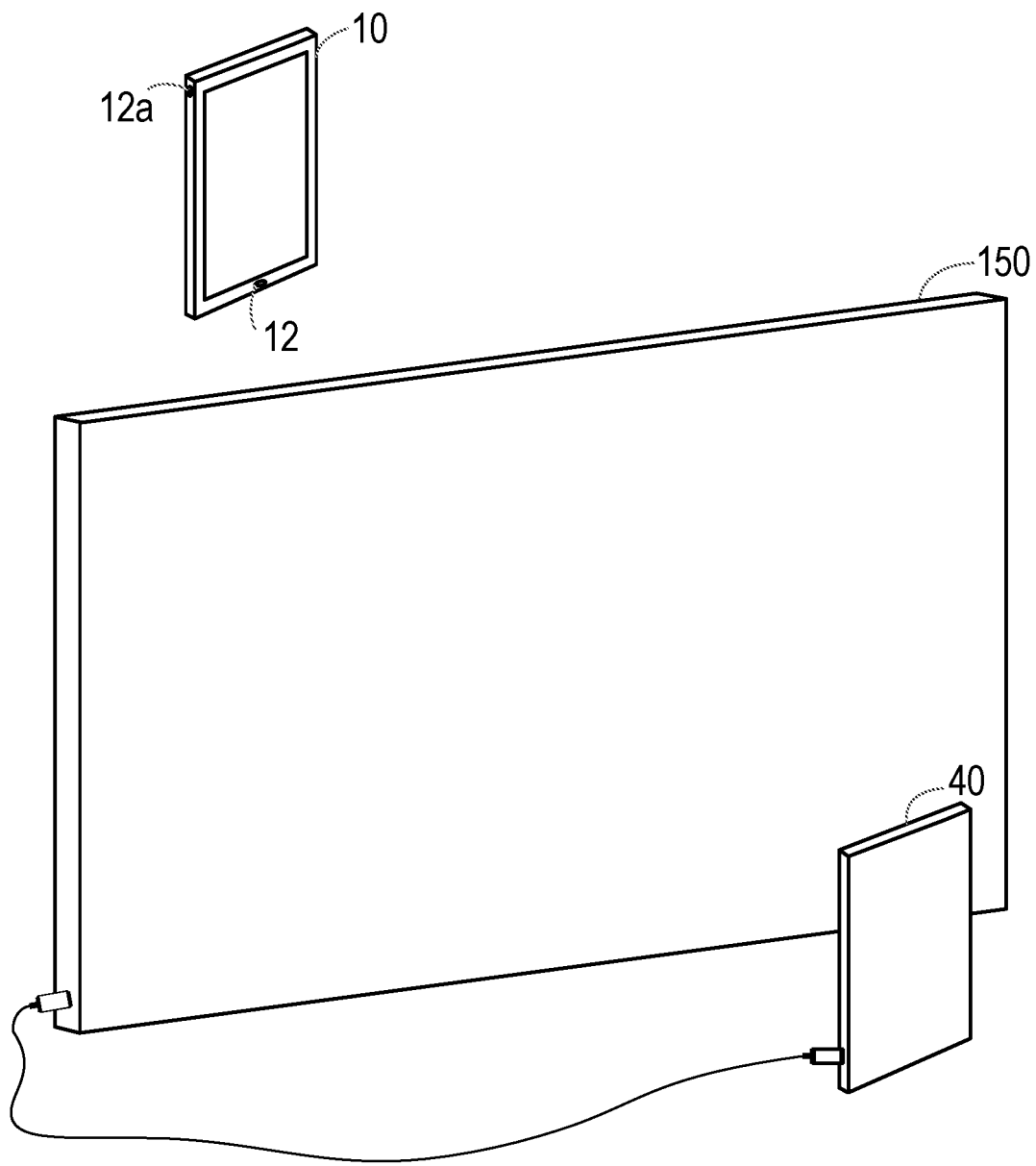
FIG. 4 illustrates a second situation in which a replay attack is being performed.

FIG. 4 shows a second example of a situation in which a replay attack is being performed, in an attempt to overcome the method of detection described above. Thus, in FIG. 4, the smartphone 10 is provided with voice biometric functionality. Again, in this example, the smartphone 10 is in the possession, at least temporarily, of an attacker, who has another smartphone 40. The smartphone 40 has been used to record the voice of the enrolled user of the smartphone 10.

In this example, the smartphone 40 is connected to a high quality loudspeaker 150. Then, the smartphone 10 is positioned close to the loudspeaker 150, and the recording of the enrolled user's voice is played back through the loudspeaker 150. As before, if the voice biometric system is unable to detect that the enrolled user's voice that it detects is a recording, the attacker will gain access to one or more services that are intended to be accessible only by the enrolled user.

In this example, the loudspeaker 150 may be of high enough quality that the recording of the enrolled user's voice played back through the loudspeaker will not be reliably distinguishable from the user's voice, and so the audio features of the speech signal cannot be used to identify the replay attack.

In this example, the loudspeaker 150 is an electrostatic loudspeaker such as a Quad® ESL, or a balanced mode radiator loudspeaker, or a bending mode or bending wave loudspeaker, or any other type of flat panel loudspeaker.

One feature of many such loudspeakers is that the apparent source of the sound is not at one point, but is diffuse, i.e. distributed over the loudspeaker.

Figure 5:
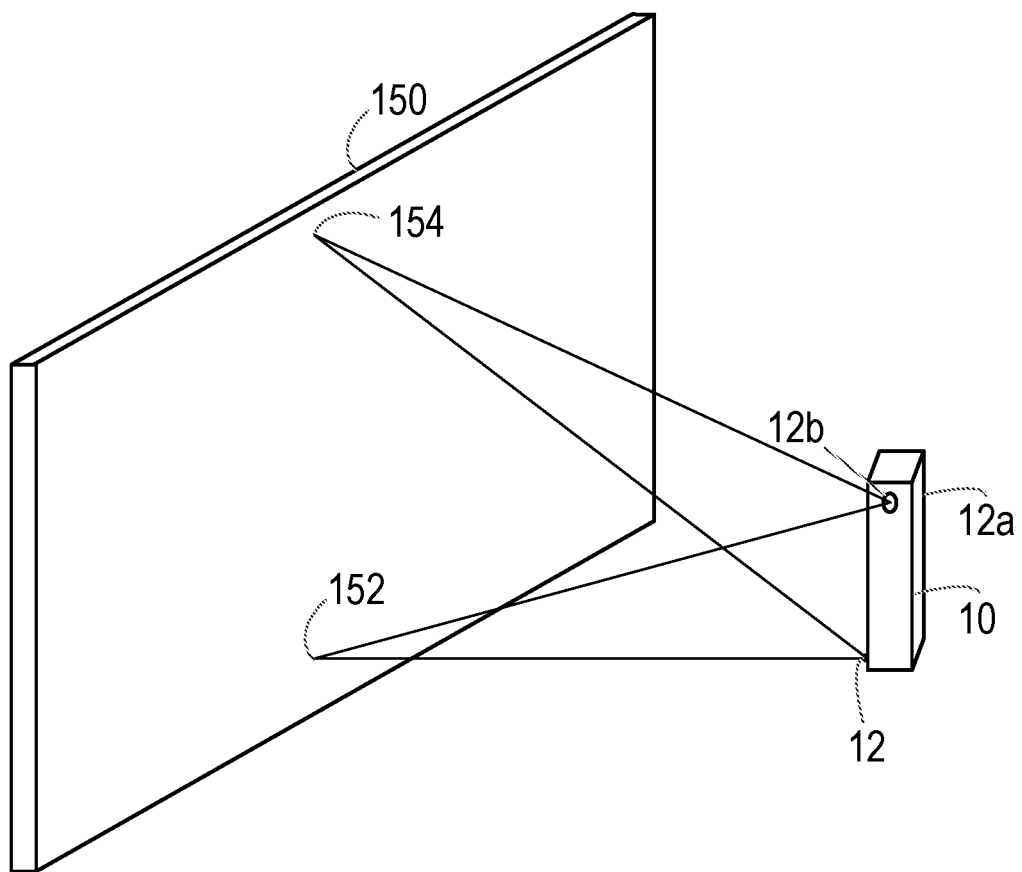
FIG. 5 illustrates sound transmission in the arrangement of FIG. 4.

FIG. 5 shows a typical arrangement, in which the loudspeaker device 150 is being used to replay speech that is detected by the smartphone 10. Thus, FIG. 5 shows sounds from a point 152 in the lower part of the loudspeaker 150 reaching the microphone 12 that is located at the bottom end of the smartphone 10, and also reaching the microphones 12a and 12b that are located at the top end of the smartphone 10. FIG. 5 also shows sounds from a point 154 in the upper part of the loudspeaker 150 reaching the microphone 12 that is located at the bottom end of the smartphone 10, and also reaching the microphones 12a and 12b that are located at the top end of the smartphone 10.

It can therefore be seen from FIG. 5 that, as seen from the smartphone 10, the sounds that it detects come from a highly diffuse source.

This contrasts with the situation where a human is speaking, when the sounds come from a relatively small area, with the human mouth for example having a maximum jaw range of motion (ROM) or maximum mouth opening (MMO) of about 5-8 cm.

The appreciation of this fact is used in the method described herein.

Figure 6:
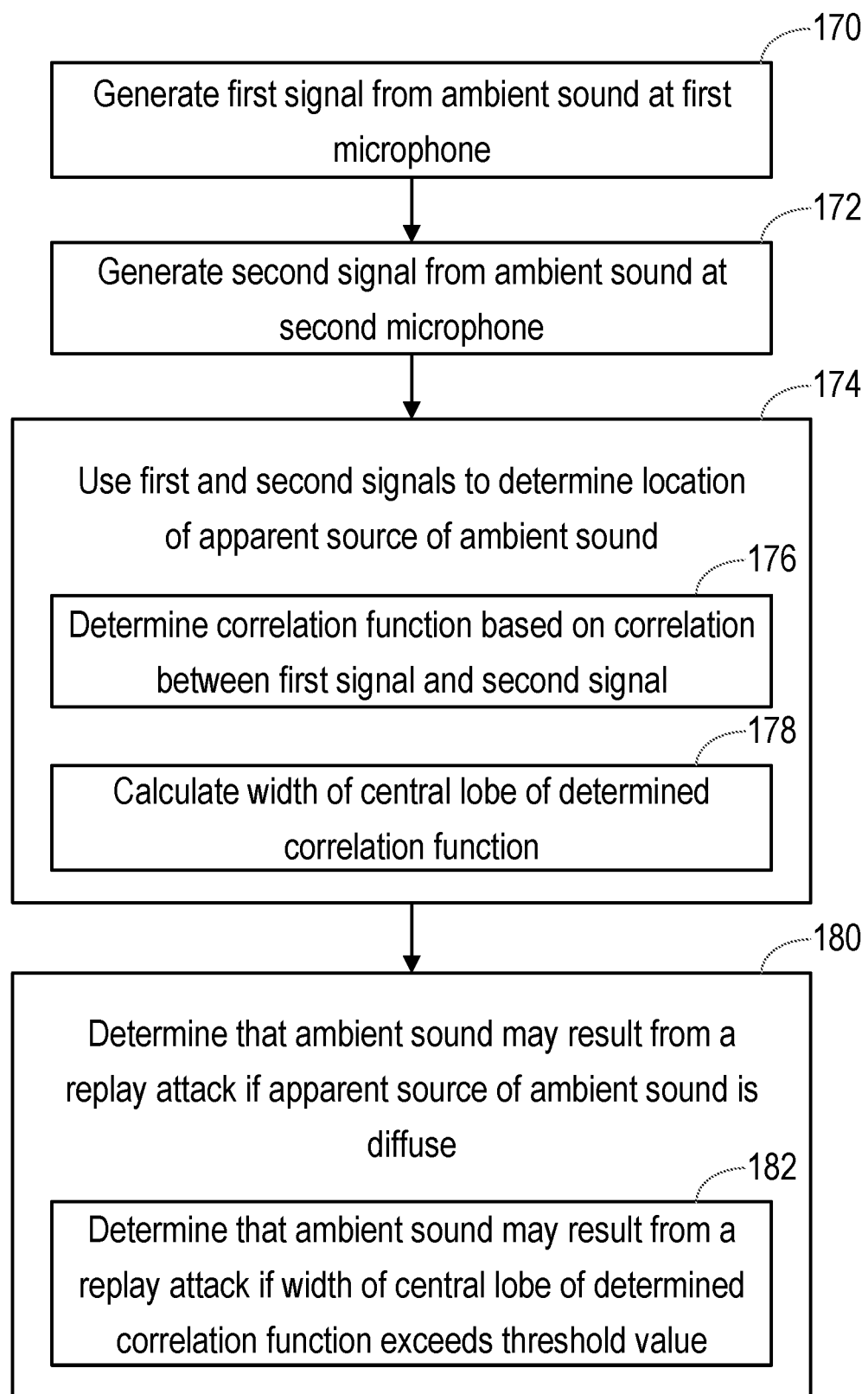
FIG. 6 is a flow chart illustrating a method.
Figure 7:
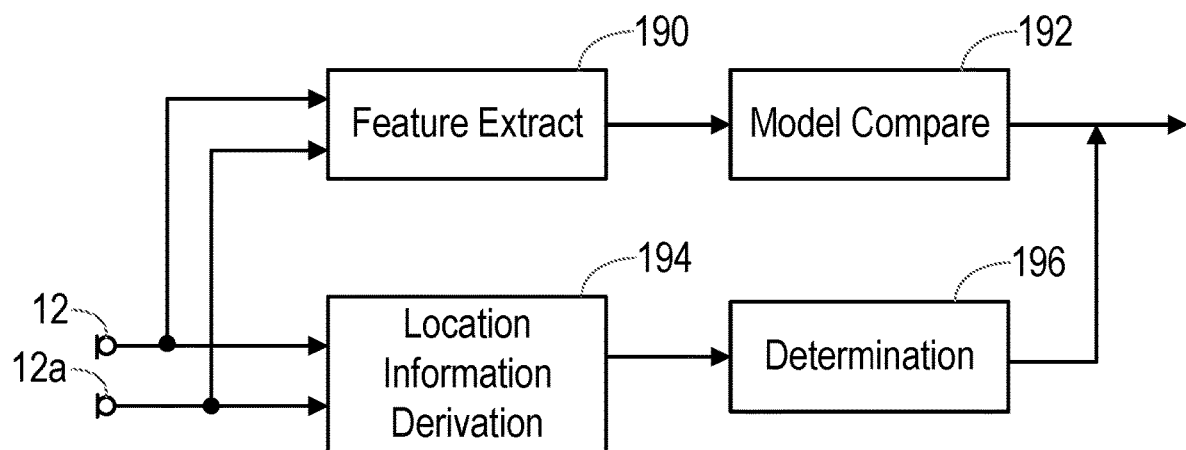
FIG. 7 is a block diagram illustrating a system for performing the method of FIG. 6.

FIG. 6 is a flow chart, illustrating a method of detecting a replay attack on a voice biometrics system, and FIG. 7 is a block diagram illustrating functional blocks in the voice biometrics system.

Specifically, in FIG. 6, in step 170, a first signal is generated at a first microphone. For example, the first microphone may be the microphone 12 that is located at the bottom end of the smartphone 10. This microphone generates a signal in response to the received sound. Similarly, in step 172, a second signal is generated at a second microphone. For example, the second microphone may be one of the microphones 12a that is located at the upper end of the smartphone 10. Again, this microphone generates a signal in response to the received sound.

In the case of a smartphone, the first and second microphones may be spaced apart by a distance in the range of 5-20 cm.

As part of the biometric operation, the first and second signals are passed to a feature extraction block 190, which extracts features of the audio signals in a known manner. In one example, the features of the audio signals may be Mel Frequency Cepstral Coefficients (MFCCs). These features are passed to a model comparison block 192, where they are compared with the corresponding features extracted from the user's speech during an enrolment process. Based on the comparison, it is determined whether the detected speech is the speech of the enrolled user.

Meanwhile, the first and second signals are also passed to a location information derivation block 194.

In step 174, the location information derivation block 194 uses the first and second signals to determine a location of an apparent source of the received sound.

More specifically, in one example, in step 176, the location information derivation block 194 performs a correlation operation on the first signal and the second signal, and determines a correlation function.

The correlation operation determines a value for the cross-correlation Rxy between the first signal and the second signal, for a range of time offsets. Thus, in this example, the first and second signals are responding to the same received sound. However, the value of the correlation depends on the position of the source of the received sound. For example, if the sound arrives at the first microphone before the second microphone, the signals will need to be offset relative to each other in one direction to achieve a match between them. This results in a high value in the correlation function with an offset in that direction. If the sound arrives at the second microphone before the first microphone, the signals will need to be offset relative to each other in the other direction to achieve a match between them. This results in a high value in the correlation function with an offset in that other direction.

This assumes that the source of the received sound is a point source. However, in reality, the source has a finite width, and so the overall correlation function that is calculated is the integral, across the whole width of the source, of these correlations between received sounds coming from point sources.

Specifically, for any point in the finite width of the source of the sound, the times of flight of the sound from that point to the two microphones can be calculated as $\tau$ and $\tau_P$. The difference between these two times will depend on the angle at which sound from that source meets the plane containing the two microphones. If the source of the sound is a diffuse source, extending from $-w_O$ to $w_O$ in the direction of the width, then the correlation result is the integral of the correlations across the width of the source:

$$R(\tau, \tau_P) = \frac{1}{2\pi}\int_{-w_O}^{w_O} e^{iw(\tau-\tau_P)} dw$$

-continued

Thus:

$$R(\tau, \tau_P) = \frac{w_o}{2\pi}\mathrm{sinc}(w_o(\tau - \tau_P))$$

The width of central lobe of this function therefore depends on the width of the source of the sound.

By making an assumption about the likely distance of the loudspeaker 150 from the smartphone 10, in the situation illustrated in FIG. 5 (for example, that it is likely that the attacker would place the smartphone between 0.10 and 1.0 metres from the loudspeaker), a suitable threshold value can be set. This threshold can represent the maximum width of the central lobe that would be expected, if the source of the sound were in fact a human mouth. If the width of the central lobe exceeds this threshold value, it can be determined that the source of the sound is likely to be a loudspeaker.

Figure 8:
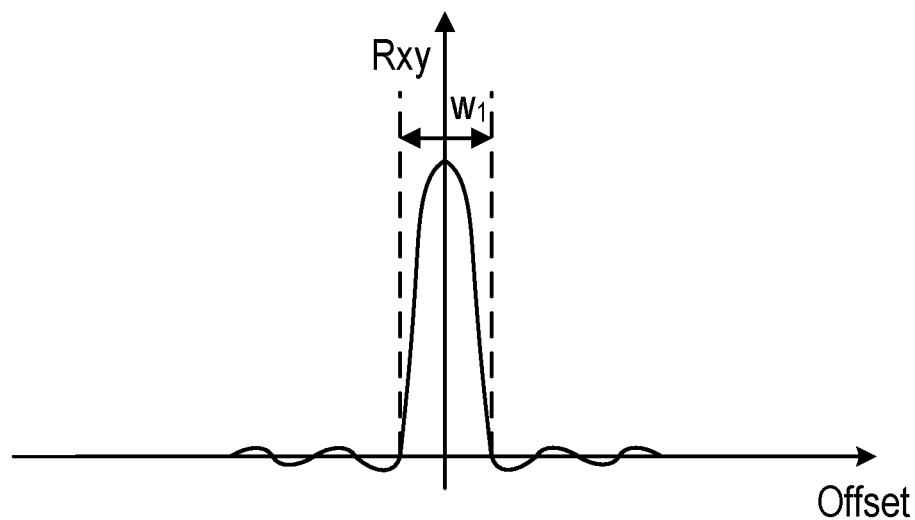
FIG. 8 illustrates a first result of performing the method of FIG. 6.

FIG. 8 illustrates an example situation where the sound is arriving at the first and second microphones from a narrow source that is located equidistantly from the first and second microphones. Thus, the peak in the central lobe of the correlation function Rxy is relatively sharp, with a width $W_1$ between the points at which the central lobe of the correlation function reaches zero, and is located at zero offset.

Figure 9:
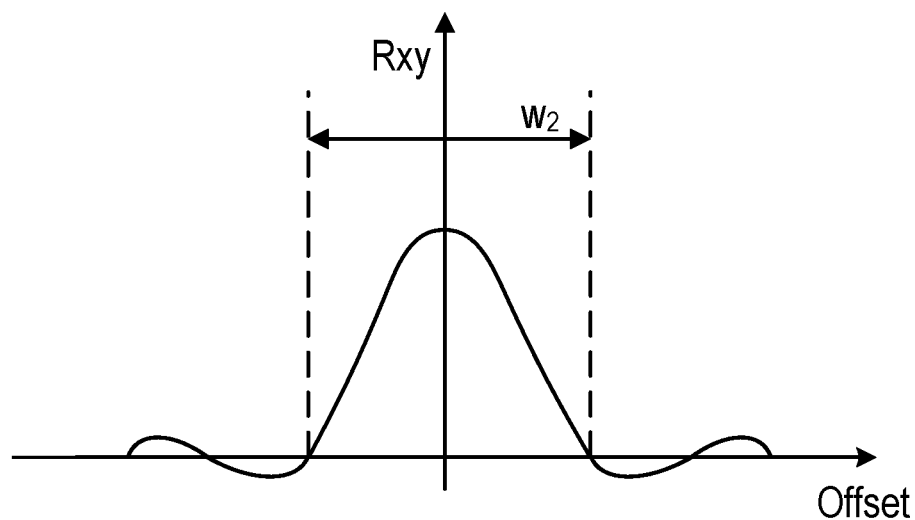
FIG. 9 illustrates a second result of performing the method of FIG. 6.

By contrast, FIG. 9 illustrates an example situation where the sound is arriving at the first and second microphones from a diffuse source, similar to that shown in FIG. 5. Thus, some parts of the source (for example the point 152 in the lower part of the loudspeaker 150) are closer to the microphone 12 that is located at the bottom end of the smartphone 10 than to the microphone 12a that is located at the top end of the smartphone 10.

Thus, sound from the point 152, and other similar points, arrives at the microphone 12 before it arrives at the microphone 12a. Therefore, as discussed above, sounds from these points result in a high value in the correlation function with an offset in one particular direction.

Conversely, other parts of the source (for example the point 154 in the upper part of the loudspeaker 150) are closer to the microphone 12a that is located at the top end of the smartphone 10 than to the microphone 12 that is located at the bottom end of the smartphone 10.

Thus, sound from the point 154, and other similar points, arrives at the microphone 12a before it arrives at the microphone 12. Therefore, as discussed above, sounds from these points result in a high value in the correlation function with an offset in the opposite direction to the sounds from points such as the point 152.

Thus, in FIG. 9, the peak in the central lobe of the correlation function Rxy is much less sharp than in FIG. 8, with a width W2 between the points at which the central lobe of the correlation function reaches zero.

In step 178 of the process shown in FIG. 6, this width of the central lobe of the correlation function is calculated.

In step 180 of the process shown in FIG. 6, this calculated width of the central lobe of the correlation function is passed to a determination block 196, and it is determined that the received sound may result from a replay attack if the apparent source of the received sound is diffuse. For example, the apparent source of the received sound may be considered to be diffuse if it is larger than a human mouth, for example if it exceeds a diameter of 5 cm.

Thus, as shown at step 182, it is determined that the received sound may result from a replay attack if the width of the central lobe of the correlation function exceeds a threshold value. That threshold value may be chosen so that the width of the central lobe of the correlation function exceeds the threshold value if the source of the received sound exceeds a diameter of about 5-8 cm.

In some embodiments, information may be obtained about the usage mode of the smartphone. For example, information may be obtained about the distance of the smartphone from the source of the received sound, for example using an ultrasound or optical proximity detection function. The threshold value may then be set based on the distance of the smartphone from the source of the received sound.

If it is determined that the received sound may result from a replay attack, an output flag or signal is sent to a further function in the voice biometric system. For example, the output of the model comparison block 192 may be halted, or may be altered so that a subsequent processing block gives less weight (or no weight at all) to an output indicating that the voice was that of the enrolled speaker.

In the example above, signals from two microphones were used to determine whether the source of the received sound is diffuse. In other examples, signals from three or more microphones may be cross-correlated (for example cross-correlated against each other in pairs) to obtain more information about the spatial diversity of the source of the detected sound.

In the examples given above, the signals from two microphones were used to determine whether the source of the received sound is diffuse. A further development of this is based on the recognition that, for certain loudspeakers at least, the idea may be extended by noting that the apparent width of the loudspeaker will vary with frequency. More specifically, the loudspeaker will appear to be wider at low frequencies than at higher frequencies.

In order to take advantage of this, the location information derivation block 194 includes two or more band-pass filters, for extracting respective frequency bands of the received signal. The method described above is then performed separately on these two frequency bands. More specifically, the first microphone generates a first signal from received sound, wherein the first signal has a first component at a first frequency and a second component at a second frequency, and wherein the first frequency is higher than the second frequency. The second microphone generates a second signal from the received sound.

Then, a first correlation function is determined based on a correlation between the first component of the first signal and the first component of the second signal. The width of a central lobe of that first correlation function is calculated. A second correlation function is determined based on a correlation between the second component of the first signal and the second component of the second signal. The width of a central lobe of that second correlation function is calculated.

The two widths are then compared, and it is determined that the received sound may have been generated by a loudspeaker, and for example may result from a replay attack, if the width of the central lobe of the determined second correlation function exceeds the width of the central lobe of the determined first correlation function by more than a threshold value.

There are therefore disclosed methods and systems that can be used for detecting a possible replay attack.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device, for example, a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of detecting a replay attack on a speech recognition system, for example a voice biometrics system, the method comprising:
  generating a first signal from received sound at a first microphone;
  generating a second signal from the received sound at a second microphone;
  determining a correlation function based on a correlation between the first signal and the second signal;
  calculating a width of a central lobe of the determined correlation function; and
  determining that the received sound may result from a replay attack if the width of the central lobe of the determined correlation function exceeds a threshold value.

2. A method according to claim 1, comprising:
  obtaining information about a distance of a sound source from the first and second microphones; and
  setting the threshold value based on the distance.

3. A method according to claim 2, wherein obtaining information about the distance of a sound source from the first and second microphones comprises:
  determining a usage mode of a device comprising the first and second microphones.

4. A method according to claim 1, wherein the first and second microphones are spaced apart by a distance of 5-20 cm.

5. A system for detecting a replay attack in a speaker recognition system, the system comprising an input for receiving a speech signal from at least a first microphone and a second microphone, and comprising a processor, and being configured to implement the method according to claim 1.

6. A device comprising a system as claimed in claim 5.

7. A device as claimed in claim 6, wherein the device comprises a mobile telephone, an audio player, a video player, a mobile computing platform, a games device, a remote controller device, a toy, a machine, or a home automation controller or a domestic appliance.

* * * * *